May 3, 1960

A. K. ALLEN 2,934,803

GEAR CLAMP

Filed April 8, 1957

INVENTOR.
ALTON K. ALLEN

BY *James and Franklin*

ATTORNEYS

United States Patent Office 2,934,803
Patented May 3, 1960

2,934,803

GEAR CLAMP

Alton K. Allen, New Hyde Park, N.Y.

Application April 8, 1957, Serial No. 651,284

5 Claims. (Cl. 24—249)

This invention relates to clamps for the hub of a rotatable element, commonly called gear clamps.

In certain fields, especially when working with precision parts, and more particularly in the field of instrumentation, it is common to provide a gear with a hub which is axially split at a number of points, and to clamp the same on a shaft by means of a clamp surrounding the hub. This applies to other rotatable elements including pinions, sprocket gears, backlash gears, ratchet wheels, clutches, flexible couplings, etc. Such clamps, dimensioned to fit the shaft instead of the hub, are also used as collars. For convenience, the term "gear clamp" is used, but is not intended to be limited to gears.

The commonly accepted form of gear clamp is made in one piece, split at one end only where it receives a clamping screw, and counterweighted at its opposite end. Such clamps have the disadvantage that they must be put in position axially, starting at the end of the shaft. Occasionally a clamp may break, and to replace it will require extensive disassembly of a complex apparatus. To overcome this, it has been suggested to use a two-piece clamp with two clamping screws, but this has the disadvantage that a greater number of small parts must be handled, with possible dropping of one part or another, and the further disadvantage that one screw may be tightened more than the other, thus making the clamping action untrue. It has also been suggested to make a gear clamp out of two parts which are hinged at one end, and provided with a clamping screw at the other. Such clamps have failed in the market, partly because of difficulty and expense of manufacture, and partly because the halves may not combine to form a true cylinder around the hub.

The primary object of the present invention is to generally improve gear clamps. A further object is to overcome the foregoing difficulties.

To accomplish these general objects, and other more specific objects which will hereinafter appear, my invention resides in the gear clamp elements, and their relation one to another, as are hereinafter more particularly described in the following specification. The specification is accompanied by a drawing in which.

Figure 1:
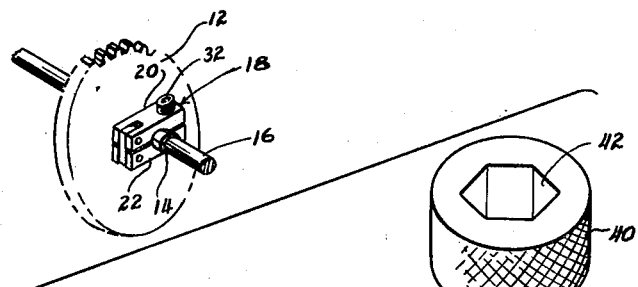
Fig. 1 is a perspective view showing a gear clamp applied to the split hub of a gear.

Referring to the drawing, and more particularly to Fig. 1, the gear 12 is integrally formed with a hub 14. This is slotted or split in axial direction in accordance with standard practice. There are usually four such slits spaced 90° apart. The gear is slipped over a shaft 16, and is secured to the shaft by means of a clamp generally designated 18. The clamp comprises jaws 20 and 22 secured together in a manner which is next described with reference to Figs. 2 and 3.

Figure 2:
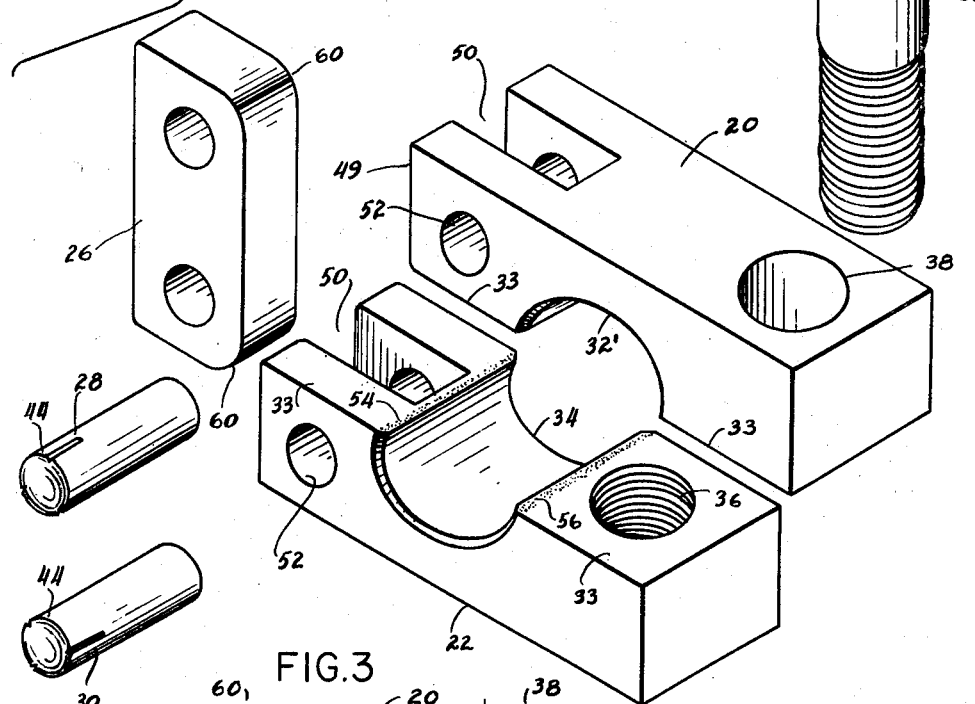
Fig. 2 is a perspective view showing the parts of the gear clamp in disassembled relation.

In those figures, it will be seen that the clamp comprises not only jaws 20 and 22, but also a link 26, two pins 28 and 30, and a screw 32 (Figs. 1 and 2). When the parts are assembled, the link 26 extends transversely of the jaws at one end of the jaws, and is pivoted thereto by the pins 28 and 30. The jaws have opposed recesses 32' and 34 which conform to the surface of a cylinder, the axis of which is transverse to the jaws and to the link, and parallel to the pins. The recesses are preferably located about mid way of the length of the jaw, so that the clamp is inherently balanced and requires no counterweight.

The screw 32 extends through the free ends of the jaws in a direction approximately parallel to the link 26 and transversely of the cylinder axis. For this purpose, the jaw 22 has a threaded hole 36, while the jaw 20 has a clearance hole 38. These holes are in alignment, as clearly shown in Fig. 3. The screw 32 is preferably an Allen head screw, the head 40 of which has a hexagonal hole 42 sunk therein.

The link 26 is generally rectangular in outline, but is well rounded at the two inside corners, as shown at 60. This permits the jaws to be swung wide open about the pins 28 and 30.

The pins 28 and 30 are secured in position in any suitable fashion, such as a drive or force fit in either the link or the jaws. In the present case, each pin has axially directed notches extending for a fraction of the length of the pin, as indicated at 44 in Fig. 2. As here shown, there are three such notches or grooves in each pin. Each indentation causes a corresponding rise of the material at each side of the indentation, and consequently when the pin is pressed into position, it is anchored in the mating furcation of the jaw.

Some important advantages of the present gear clamp center about the ease and economy of manufacturing the same with precision. Specifically, the jaws 20 and 22 are preferably rectangular hardened steel blocks which are formed by cutting in half a single larger block having the overall dimension indicated in Fig. 3. This large block is provided with a complete cylindrical hole defining the parts 32' and 34, and shown completed by broken lines at 46. The initial outline of the block is also shown by the broken line 48.

This large block is milled or otherwise machined parallel to the end 49 to bifurcate the same, thus forming the slots 50, best shown in Fig. 2. At this time, there is one continuous slot through the edge 49 of the block. Moreover, the holes 52 for the pins are preferably formed in the block before it is severed, and similarly the holes 36 and 38 are preferably formed before severance of the block. The latter may be done by two drilling operations followed by a tapping operation, or more preferably, by a single drilling operation using a stepped drill (one having two diameters), followed by a tapping operation. The stepping of the hole produced by the stepped drill while the block is still in one piece is suggested in broken lines at 62.

The severance of the large block into two jaws is preferably done in two stages. The first stage cuts the block from each end toward the large central cylindrical hole 32', 34, to reach points closely approaching but not quite reaching the hole. These cuts form the surfaces 33. The said cuts come as far as the stippled areas shown at 54 and 56 in Fig. 2. It will be understood that the block is made of a suitable hardenable steel, but at this time, the block has not yet been hardened. The block then is subjected to appropriatae heat treatment to harden the same, bringing it to a desired hardness of, say 40 Rockwell.

Figure 3:
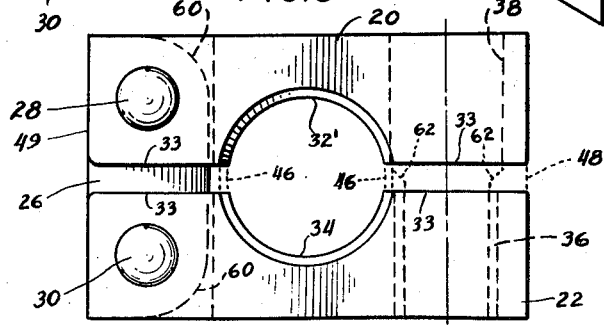
Fig. 3 is a front elevation showing the assembled gear clamp, with only the clamp screw omitted.

Finally, the jaws are severed, as by means of a grinding wheel which cuts through the slight amount of material remaining at the stippled areas 54 and 56, and which corresponds approximately to material left between the closely adjacent dotted lines at 46 in Fig. 3. This method gives accuracy and precision at minimum cost. The fact that the clamp has been made in this fashion is discernable from inspection in the finished clamp, because of a difference in the texture of the surface of the areas 54 and 56, compared to the rest of the areas 33.

The pins 28 and 30 are preferably hardened to a somewhat greater hardness, say to 50 or 60 Rockwell, thus permitting them to bite into the material of the jaws when pressed home.

If a single pin were used, it would require that each of the jaws constitute more than, rather than less than, a semicircle, and therefore it would not be possible to make the two jaws out of a single block of material. Such a clamp would be more expensive to make, and more difficult to make with the desired accuracy.

If desired, the link 26 may be put in position and the pins 28 and 30 pressed home before the final severance of the jaws. This constitutes a final check on the accuracy of the link in relation to the jaws. Indeed, in a slightly variant process, the link may be put in position after milling the slot 50, and before drilling the holes 52. The holes then may be drilled simultaneously through the block and the link. Another variant is to drill the holes 52 in the block before milling the slot 50, following which the link is inserted in slot 50, and its holes drilled by guiding a drill through the previously made holes 52.

In all these procedures, it will be seen that perfect accuracy of the recesses 32' and 34 to conform them to a true cylinder, is maintained even during the heat treatment step. Perfect alignment of the holes 36 and 38 is assured, as well as a desired accurate spacing between the upper and lower holes 52 which receive the pins.

It is believed that the construction and method of use of my improved gear clamp, as well as the advantages thereof, will be apparent from the foregoing detailed description. Apart from the important advantages in manufacture already described, there are advantages in use, for the parts of the clamp constitute a single connected body except for the clamp screw, and it is therefore easy to apply the clamp, even in a relatively inaccessible location. When the screw is tightened, the recesses are drawn to perfect cylindrical shape. Any slight readjustment which may be needed because of the configuration of the hub of any particular gear is better accommodated by the two spaced pivots here provided, than would be the case with an integral clamp, or with a two-piece clamp having one pivot. In other words, the present clamp has improved accommodation to the configuration of the split hub on which it is used.

In the usual case, the gear clamp is quite small and is used with "instrument" or "control" type gearing. In the specific case illustrated, the shaft is one-quarter inch in diameter. The hub of the gear is five-sixteenths of an inch in diameter. The clamp has an overall dimension of about three-sixteenths by three-eighths by three-quarters of an inch. In Fig. 1, the length of the hub 14 of the gear has been somewhat exaggerated, and in the usual case the hub terminates about flush with the clamp.

It will be apparent that while I have shown and described my invention in a preferred form, changes may be made in the structure shown, without departing from the scope of the invention, as sought to be defined in the following claims.

I claim:

1. An accurately dimensioned gear clamp for use with precision apparatus of the instrument type, said gear clamp comprising two jaws, a link, two pins, and a screw, said link extending substantially perpendicularly to said jaws at one end of said jaws, and being pivoted thereto by said pins, said jaws having opposed recesses which conform to the surface of a cylinder the axis of which is perpendicular to the jaws and link, and parallel to the pins, and located about mid way of the length of the jaws, and said screw extending through the free ends of the jaws in a direction substantially parallel to the link and substantially perpendicular to the pins and cylinder axis, said jaws being generally rectangular hardened steel blocks, each block being half of a single larger block having a cylindrical hole formed therethrough substantially half way between the top and bottom edges of the block for the recesses, said half blocks having been severed in two stages, the first of which cut the single large block from each end toward the cylindrical hole on a plane which is diametrical of the hole to a point closely approaching but not quite reaching the cylindrical hole before hardening, and the second of which completed the severance after hardening, whereby the clamp is substantially symmetrical with jaws which retain substantially the relation they had in the original single block.

2. An accurately dimensioned gear clamp for use with precision apparatus of the instrument type, said gear clamp comprising two jaws, a link, two pins, and a screw, said link extending substantially perpendicularly to said jaws at one end of said jaws, and being pivoted thereto by said pins, said jaws having opposed recesses which conform to the surface of a cylinder the axis of which is perpendicular to the jaws and link, and parallel to the pins, and located about mid way of the length of the jaws, and said screw extending through the free ends of the jaws in a direction substantially parallel to the link and substantially perpendicular to the pins and cylinder axis, one jaw having a threaded hole and the other jaw having an aligned clearance hole for said screw, said jaws being generally rectangular hardened steel blocks, each block being half of a single larger block having a cylindrical hole formed therethrough substantially half way between the top and bottom edges of the block for the recesses and having one end bifurcated to receive the link and having the aforesaid pin holes and screw holes, said half blocks having been severed in two stages, the first of which cut the single large block from each end toward the cylindrical hole on a plane which is diametrical of the hole to a point closely approaching but not quite reaching the cylindrical hole before hardening, and the second of which completed the severance after hardening, whereby the clamp is substantially symmetrical with jaws which retain substantially the relation they had in the original single block.

3. In the manufacture of the jaw of an accurately dimensioned gear clamp for use with precision apparatus of the instrument type, said gear clamp comprising two jaws, a link, two pins, and a screw, said link extending substantially perpendicularly to said jaws at one end of said jaws, and being pivoted thereto by said pins, said jaws having opposed recesses which conform to the surface of a cylinder the axis of which is perpendicular to the jaws and link, and parallel to the pins, and located about mid way the length of the jaws, and said screw extending through the free ends of the jaws in a direction substantially parallel to the link and substantially perpendicular to the pins and cylinder axis, the method of making the jaws which includes forming a single large block having substantially the dimension of the gear clamp, forming a cylindrical hole therethrough for the recesses and milling one end to bifurcate the same to receive the link and drilling the pin holes and screw holes therein in any desired order, thereafter cutting the block from each end toward the cylindrical hole to a point closely approaching but not quite reaching the cylindrical hole, then heat treating the block to harden the same, and finally completing the severance of the block into two halves which constitute the two jaws of the gear clamp.

4. In the manufacture of the jaws of an accurately dimensioned gear clamp for use with precision apparatus of the instrument type, said gear clamp comprising two jaws, a link, two pins, and a screw, said link extending substantially perpendicularly to said jaws at one end of said jaws, and being pivoted thereto by said pins, said jaws having opposed recesses which conform to the surface of a cylinder the axis of which is perpendicular to the jaws and link, and parallel to the pins, and located about mid way of the length of the jaws, and said screw extending through the free ends of the jaws in a direction substantially parallel to the link and substantially perpendicular to the pins and cylinder axis, the method of making the jaws which includes forming a single large block having substantially the dimension of the gear clamp, forming a cylindrical hole therethrough for the recesses, thereafter cutting the block from each end toward the cylindrical hole to a point closely approaching but not quite reaching the cylindrical hole, then heat treating the block to harden the same, and finally completing the severance of the block into two halves which constitute the two jaws of the gear clamp.

5. An accurately dimensioned gear clamp for use with precision apparatus of the instrument type, said gear clamp comprising two jaws, a link, two pins, and a screw, said link extending substantially perpendicularly to said jaws at one end of said jaws, and being pivoted thereto by said pins, said jaws having opposed recesses which conform to the surface of a cylinder the axis of which is perpendicular to the jaws and link, and parallel to the pins, and located about mid way of the length of the jaws, and said screw extending through the free ends of the jaws in a direction substantially parallel to the link and substantially perpendicular to the pins and cylinder axis, one jaw having a threaded hole and the other jaw having an aligned clearance hole for said screw, said jaws being generally rectangular hardened steel blocks, each block being half of a single larger block having a cylindrical hole formed therethrough substantially half way between the top and bottom edges of the block for the recesses and having one end bifurcated to receive the link and having the aforesaid pin holes, said half blocks having been severed in two stages, the first of which cut the single large block from each end toward the cylindrical hole on a plane which is diametrical of the hole to a point closely approaching but not quite reaching the cylindrical hole before hardening, and the second of which completed the severance after hardening, whereby the clamp is substantially symmetrical with jaws which retain substantially the relation they had in the original single blocks.

References Cited in the file of this patent

UNITED STATES PATENTS

| | | |
|---|---|---|
| 1,280,850 | Robichaux et al. | Oct. 8, 1918 |
| 1,455,939 | Roof | May 22, 1923 |
| 1,703,232 | Gray et al. | Feb. 26, 1929 |
| 2,259,054 | Young | Oct. 14, 1941 |
| 2,547,932 | Downs | Apr. 10, 1951 |

FOREIGN PATENTS

| | | |
|---|---|---|
| 649,910 | France | Sept. 10, 1928 |